US012559643B2

(12) United States Patent
Miao et al.

(10) Patent No.: US 12,559,643 B2
(45) Date of Patent: Feb. 24, 2026

(54) THERMAL INSULATION COATING AND METHOD FOR APPLYING THE SAME

(71) Applicant: SHANGHAI PILOT NEW MATERIAL RESEARCH CO., LTD., Jiangsu (CN)

(72) Inventors: Zhenlu Miao, Jiangsu (CN); Minhua Mo, Jiangsu (CN); Changming Li, Jiangsu (CN); Dongqin Qiu, Jiangsu (CN); Liang Chang, Jiangsu (CN)

(73) Assignee: SHANGHAI PILOT NEW MATERIAL RESEARCH CO., LTD., Jiangsu (CN)

( * ) Notice: Subject to any disclaimer, the term of this patent is extended or adjusted under 35 U.S.C. 154(b) by 553 days.

(21) Appl. No.: 17/994,524

(22) Filed: Nov. 28, 2022

(65) Prior Publication Data

US 2023/0143737 A1 May 11, 2023

Related U.S. Application Data

(63) Continuation of application No. PCT/CN2022/124397, filed on Oct. 10, 2022.

(30) Foreign Application Priority Data

Nov. 11, 2021 (CN) .......................... 202111330844.9

(51) Int. Cl.
| | |
|---|---|
| *C09D 127/16* | (2006.01) |
| *B05D 7/00* | (2006.01) |
| *B05D 7/14* | (2006.01) |
| *C09C 1/00* | (2006.01) |
| *C09C 1/40* | (2006.01) |

(Continued)

(52) U.S. Cl.
CPC ............. *C09D 127/16* (2013.01); *B05D 7/14* (2013.01); *B05D 7/542* (2013.01); *C09C 1/0081* (2013.01); *C09C 1/407* (2013.01); *C09D 7/20* (2018.01); *C09D 7/61* (2018.01); *C09D 7/67* (2018.01); *C09D 7/68* (2018.01); *B05D 2202/00* (2013.01); *B05D 2350/60* (2013.01); *B05D 2506/10* (2013.01)

(58) Field of Classification Search
CPC .......... C09D 127/16; C09D 7/61; C09D 7/20; C09D 7/67; C09D 7/68; B05D 7/14; B05D 7/542; B05D 2202/00; B05D 2350/60; B05D 2506/10; C09C 1/0081; C09C 1/407
See application file for complete search history.

(56) References Cited

U.S. PATENT DOCUMENTS

2003/0085384 A1    5/2003  Burnell-Jones

FOREIGN PATENT DOCUMENTS

| | | |
|---|---|---|
| CN | 102585626 A | 7/2012 |
| CN | 103265856 A | 8/2013 |

(Continued)

OTHER PUBLICATIONS

International Search Report of Corresponding Application PCT/CN2022/124397; Jan. 9, 2023; 4 Pgs.

*Primary Examiner* — Robert S Walters, Jr.
(74) *Attorney, Agent, or Firm* — Cooper Legal Group, LLC

(57) ABSTRACT

The present application discloses a thermal insulation coating and a method for applying the same. Raw materials for preparing the thermal insulation coating includes PVDF resin, water-based epoxy resin solution, hollow glass micro- (Continued)

bead, ytterbium modified nano-powder, diluent, polyvinyl alcohol, titanium dioxide powder, rare earth, negative ion powder, and leveling agent.

6 Claims, 1 Drawing Sheet

(51) Int. Cl.
C09D 7/20        (2018.01)
C09D 7/40        (2018.01)
C09D 7/61        (2018.01)

(56)                    References Cited

FOREIGN PATENT DOCUMENTS

| | | | |
|---|---|---|---|
| CN | 104293012 | A | 1/2015 |
| CN | 105130414 | A | 12/2015 |
| CN | 106280749 | A | 1/2017 |
| CN | 106752526 | A | 5/2017 |
| CN | 109054529 | A | 12/2018 |
| CN | 109651901 | A | 4/2019 |
| CN | 111129405 | A | 5/2020 |
| CN | 111454620 | A | 7/2020 |
| CN | 113999577 | A | 2/2022 |

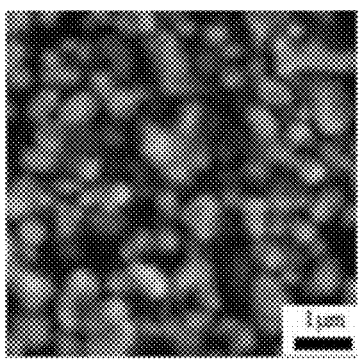

THERMAL INSULATION COATING AND METHOD FOR APPLYING THE SAME

CROSS-REFERENCE TO RELATED APPLICATIONS

The present application is a continuation of international PCT application serial no. PCT/CN2022/124397, filed on Oct. 10, 2022, which claims the priority of Chinese application No. 202111330844.9, filed on Nov. 11, 2021. The entireties of PCT application serial no. PCT/CN2022/124397 and Chinese application No. 202111330844.9 are hereby incorporated by reference herein and made a part of this specification.

TECHNICAL FIELD

The present application relates to the technical field of thermal insulation coating, and particularly to a thermal insulation coating and a method for applying the same.

BACKGROUND ART

In recent years, with rapid development of economy, people's requirements for comfortable living environment are constantly increasing. In summer, energy of thermal radiation under sunlight will be accumulated on surface of building, resulting in the continuous rise of the surface temperature, and the heat is transferred to the interior of the building, which seriously affects people's living comfort level and increase the power consumption of air conditioners, fans, refrigerators and other refrigeration facilities at the same time. Excess use of air conditioners in summer has made building energy consumption become one of the main fields of energy consumption in China. Therefore, how to reduce surface temperature of buildings to achieve the purpose of energy saving and emission reduction is one of research hotspots at home and abroad. The application of thermal insulation coating can reduce the heat radiation absorbed by the exterior surface of buildings and reduce the heat load of indoor air conditioning, which has attracted people's attention.

SUMMARY

In order to solve the technical problems present in the prior art, an object of the present application is to provide a thermal insulation coating, a method for preparing the thermal insulation coating and a method for applying the thermal insulation coating.

The present application provides the following technical solution:

a thermal insulation coating, in which raw materials for preparing the thermal insulation coating includes the following components in parts by weight:

70-80 parts of polyvinylidene difluoride (PVDF) resin,
5-10 parts of water-based epoxy resin solution,
1-10 parts of hollow glass microbead,
5-10 parts of ytterbium modified nano-powder,
10-20 parts of diluent,
8-15 parts of polyvinyl alcohol,
3-5 parts of titanium dioxide powder,
2-10 pars of rare earth,
0-5 parts of negative ion powder, and
0.01-1 parts of leveling agent.
In some embodiments, the thermal insulation coating is made from the above components in parts by weight.

In some embodiments, the thermal insulation coating further includes 0-10 parts of zirconia ceramic powder having a particle size of 30-50 nm.

In some embodiments, the ytterbium modified nano-powder is ytterbium modified nano-alumina powder having a particle size of 500-600 nm.

In some embodiments, the ytterbium modified nano-powder is prepared by mixing nano-alumina with ytterbium oxide powder.

The present application further provides a method for preparing a thermal insulation coating, including the following steps:

Mixing 70-80 parts of PVDF resin, 5-10 parts of water-based epoxy resin solution, 10-20 parts of diluent, and 0.01-1 parts of leveling agent, based on parts by weight, to obtain an emulsion, sequentially adding 1-10 parts of hollow glass microbead, 5-10 parts of ytterbium modified nano-powder, 3-5 parts of titanium dioxide powder, 2-10 pars of rare earth, 0-5 parts of negative ion powder, and 8-15 parts of polyvinyl alcohol, based on parts by weight, into the emulsion under stirring, and filtering to obtain the thermal insulation coating.

The present application further provides a method for applying a thermal insulation coating in the field of thermal insulation agents.

The present application further provides a method for applying a thermal insulation coating on a metal surface.

The present application provides a method for applying the thermal insulation coating on a metal surface, including the following steps:

Coating the thermal insulation coating on a metal surface coated with a primer, and solidifying the thermal insulation coating at a temperature of 200-245° C. to form a film with a thickness of 20-30 μm.

Compared with the prior art, the present application can achieve at least one of the following beneficial effects.

The present application provides a thermal insulation coating, a method for preparing the thermal insulation coating and a method for applying the thermal insulation coating. The raw materials for preparing the thermal insulation coating includes the following components in parts by weight: 70-80 parts of PVDF resin, 5-10 parts of water-based epoxy resin solution, 1-10 parts of hollow glass microbead, 5-10 parts of ytterbium modified nano-powder, 10-20 parts of diluent, 8-15 parts of polyvinyl alcohol, 3-5 parts of titanium dioxide powder, 2-10 pars of rare earth, 0-5 parts of negative ion powder, and 0.01-1 parts of leveling agent. In the present application, the added PVDF resin, water-based epoxy resin solution and polyvinyl alcohol work synergistically to form a dense film. In particular, the polyvinyl alcohol has good interfacial activity, so that the raw materials are mixed more evenly, and the obtained coating has better leveling performance. The obtained dense film can endow the thermal insulation coating with a better thermal insulation effect. The added hollow glass microbead and zirconia ceramic powder serve a function of blocking heat conduction. The added titanium dioxide powder serves a function of heat reflecting. The ytterbium modified nano-powder serves a function of thermal sealing and insulation. Owing to reflecting, scattering, refracting, and other effects provided by the microporous structure of the ytterbium modified nano-powder and thus decreased thermal conductivity and reduced heat transfer via convection, the synergism of the rare earth, the hollow glass microbead, the ytterbium modified nano-powder, the titanium dioxide powder and/or the zirconia ceramic powder significantly enhances the thermal insulation performance and the hightemperature resistance of the obtained coating, so that the coating can be made into a thermal insulation coating or a thermal insulation agent. The obtained coating can be further applied on a metal surface to improve the thermal insulation property thereof. The addition of the negative ion powder helps improve the quality of the environment, and endows the coating with diversified functions and broad application prospect.

BRIEF DESCRIPTION OF THE DRAWINGS

FIG. 1 is a SEM image of the ytterbium modified nano-powder in Example 1.

DETAILED DESCRIPTION

The present application will be further described in detail below, so that the advantages and features of the present application may be obvious to those skilled in the art.

A thermal insulation coating is provided, in which raw materials for preparing the thermal insulation coating includes the following components in parts by weight:

70-80 parts of PVDF resin,
5-10 parts of water-based epoxy resin solution,
1-10 parts of hollow glass microbead,
5-10 parts of ytterbium modified nano-powder,
10-20 parts of diluent,
8-15 parts of polyvinyl alcohol,
3-5 parts of titanium dioxide powder,
2-10 pars of rare earth,
0-5 parts of negative ion powder,
0.01-1 parts of leveling agent, and
0-10 parts of zirconia ceramic powder.

The PVDF resin is Kynar 370 from Arkema Corporation (France) or PVDF resin from Solvay (France).

The hollow glass microbead is one of Model VS5500 glass microbead (3M Corporation), Model NBS-2656 glass microbead, or Model C20 glass microbead (Zhongke Huaxing Ltd.).

As shown in FIG. 1, the ytterbium modified nano-powder has a microporous structure with particle size of 500-600 nm. The ytterbium modified nano-powder is ytterbium modified nano-alumina powder. In particular, the ytterbium modified nano-powder is prepared by mixing nano-alumina and ytterbium oxide powder. Specifically, the ytterbium modified nano-powder is made from nano-alumina and ytterbium oxide powder in a weight ratio of (1-2):(1-4) by the steps of grinding (or ball milling), drying, crumbling and calcining. The drying is performed at a temperature of not more than 70° C. for 20-30 h, and the calcining is performed at a temperature of 900-1250° C., with a heating rate of 8-15° C./min.

Titanium dioxide powder is one of Model C25 (Shanghai Chaowei Nanotechnology Co., Ltd.) or Model R105 (Du-Pont).

The zirconia ceramic powder has a particle size of 30-50 nm, and is one of Model HN-R50Y3 zirconia ceramic powder (Hangzhou Hengna New Materials Co., Ltd) or zirconia powder with a particle size of 30-50 nm (Shanghai Xianxin New Materials Technology Co., Ltd).

The leveling agent is one of BNK-4011 (Milliken, U.S.), Model Capstone FS-3100 (DuPont, U.S.), Model Capstone FS-65 (Chemours, U.S.), or Model TEGO Glide 410 (Evonik, Germany).

The diluent is one or two of xylene, cyclohexanone, butyl acetate or dimethylformamide.

The present application provides a method for preparing a thermal insulation coating, including the following steps:

Adding 70-80 parts of PVDF resin, 5-10 parts of water-based epoxy resin solution, 10-20 parts of diluent, and 0.01-1 parts of leveling agent, based on parts by weight, into a mixer under stirring at an appropriate speed (90-150 r/min) for 5-10 min to obtain an emulsion, then adding 1-10 parts of hollow glass microbead, 5-10 parts of ytterbium modified nano-powder, 3-5 parts of titanium dioxide powder, 2-10 parts of rare earth, 0-5 parts of negative ion powder, and 8-15 parts of polyvinyl alcohol, based on parts by weight, into the emulsion under stirring at an appropriate speed (260-320 r/min) for 25-35 min, standing, and filtering via a 100-150 mesh screen to obtain the thermal insulation coating. Individual components of the raw materials are added separately at a time interval of 3-15 min.

The present application further provides an application of the thermal insulation coating in the field of thermal insulation agents.

The present application further provides a method for applying the thermal insulation coating on a metal surface.

The present application further provides a method for applying the thermal insulation coating on a metal surface, including the following steps:

Coating the thermal insulation coating on a metal surface coated with a primer by using a coater, and solidifying the thermal insulation coating at a temperature of 200-245° C. to form a film with a thickness of 20-30 μm.

The metal is one of stainless steel, aluminum alloy, galvanized steel, or aluminum-zinc plated steel. The metal is cleaned by commercially available degreasing liquid agent, then coated with fluorocarbon primer having a thickness of 10-25 μm, and finally coated with the thermal insulation coating according to the present application.

Example 1

This example provided a method for preparing a thermal insulation coating, including the following steps.

70 parts of Model Kynar 370 PVDF resin (Arkema, France), 10 parts of water-based epoxy resin solution, 0.05 parts of Model CapstoneFS-3100 leveling agent (DuPont, U.S.) and 18 parts of dimethylformamide diluent were put into a mixer and mixed under stirring at a speed of 100 r/min for 5 min. The obtained mixture in the mixer was added with 1 part of Model VS5500 glass microbead (3M Corporation), 10 parts of ytterbium modified nano-alumina powder, 3 parts of Model R105 titanium dioxide powder (DuPont), 6 parts of rare earth (rare earth titanate), 3 parts of negative ion powder, 10 parts of polyvinyl alcohol and 5 parts of Model HN-R50Y3 zirconia ceramic powder (Hangzhou Hengna New Materials Co., Ltd), stirred at 300 r/min for 30 min, left to stand, and filtered through 150-mesh sieve to obtain the desired thermal insulation coating. Individual components of the raw materials were added separately at a time interval of 10 min.

As shown in FIG. 1, the ytterbium modified nano-alumina powder has a particle size of 570-590 nm, and has a microporous structure, in which gas molecules in micropores have an extremely low flow ability to block a heat transfer via convection, and walls of the micropores reflect and refract some of the heat flow to decrease heat transfer via radiation. The ytterbium modified nano-powder is ytterbium modified nano-alumina powder made from the nano-alumina and ytterbium oxide powder in a weight ratio of 1:2 by the steps of grinding or ball milling, drying, crumbling and calcining. The drying was performed at a temperature of not more than 70° C. for 25 h, and the calcining was performed at a temperature of 900-1250° C. with a heating rate of 12-15° C./min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, and then solidified at 220° C. to form a film with a thickness of 20-30 μm.

Example 2

This example provided a method for preparing the thermal insulation coating, including the following steps.

70 parts of Kynar 370 PVDF resin (from Arkema), 10 parts of water-based epoxy resin solution, 0.05 parts of CapstoneFS-3100 leveling agent (from DuPont) and 18 parts of dimethylformamide diluent were added into a mixer, and mixed under stirring at a speed of 100 r/min for 5 min. The obtained mixture in the mixer was added with 3 parts of Model VS5500 glass microbead (3M Corporation), 10 parts of ytterbium modified nano-alumina powder, 3 parts of R105 titanium dioxide powder (DuPont), 6 parts of rare earth (rare earth titanate), 3 parts of negative ion powder, 10 parts of polyvinyl alcohol and 5 parts of Model HN-R50Y3 zirconia ceramic powder (Hangzhou Hengna New Materials Co., Ltd) stirred at 300 r/min for 30 min, left to stand, and filtered through a 150-mesh sieve to obtain the thermal insulation coating. Individual components of the raw materials were added separately at a time interval of 5 min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, and then solidified at 220° C. to form a film with a thickness of 20-30 μm.

Other conditions and parameters were the same as those in Example 1.

Example 3

This example provided a method for preparing a thermal insulation coating, including the following steps.

70 parts of Kynar 370 PVDF resin (Arkema), 10 parts of water-based epoxy resin solution, 0.05 parts of CapstoneFS-3100 leveling agent (DuPont) and 18 parts of dimethylformamide diluent were added into a mixer, and mixed under stirring at a speed of 100 r/min for 5 min. Then the obtained mixture in the mixer was added with 5 parts of Model VS5500 glass microbead (3M Corporation), 10 parts of ytterbium modified nano-alumina powder, 3 parts of Model R105 titanium dioxide powder (DuPont), 6 parts of rare earth (rare earth titanate), 5 parts of negative ion powder, 10 parts of polyvinyl alcohol and 5 parts of Model HN-R50Y3 zirconia ceramic powder (Hangzhou Hengna New Materials Co., Ltd), stirred at 300 r/min for 30 min, left to stand, and filtered through a 150-mesh sieve to obtain the thermal insulation coating. Individual components of the raw materials were added separately at a time interval of 5 min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, and then solidified at 220° C. to form a film with a thickness of 20-30 μm.

Other conditions and parameters were the same as those in Example 1.

Example 4

This example provided a method for preparing the thermal insulation coating, including the following steps.

70 parts of Model Kynar 370 PVDF resin (Arkema), 10 parts of water-based epoxy resin solution, 0.05 parts of Model CapstoneFS-3100 leveling agent (DuPont) and 18 parts of dimethylformamide diluent were added into a mixer, and mixed under stirring at a speed of 100 r/min for 5 min. The obtained mixture in the mixture was added with 7 parts of Model VS5500 glass microbead (3M Corporation), 10 parts of ytterbium modified nano-alumina powder, 3 parts of Model R105 titanium dioxide powder (DuPont), 6 parts of rare earth, 2 parts of negative ion powder, 10 parts of polyvinyl alcohol and 5 parts of Model HN-R50Y3 zirconia ceramic powder (Hangzhou Hengna New Materials Co., Ltd), stirred at 300 r/min for 30 min left to stand, and filtered through a 150-mesh sieve to obtain the thermal insulation coating. Individual components of the raw materials were added separately at a time interval of 10 min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, and then solidified at 220° C. to form a film with a thickness of 20-30 μm.

Other conditions and parameters were the same as those in Example 1.

Example 5

This example provided a preparation method for the thermal insulation coating, including the following steps:

70 parts of Model Kynar 370 PVDF resin (Arkema), 10 parts of water-based epoxy resin solution, 0.05 parts of Model CapstoneFS-3100 leveling agent (DuPont) and 18 parts of dimethylformamide diluent were added into a mixer, and stirred at a speed of 100 r/min for 5 min. The obtained mixture in the mixture was added with 9 parts of Model VS5500 glass microbead (3M Corporation), 10 parts of ytterbium modified nano-alumina powder, 3 parts of Model R105 titanium dioxide powder (DuPont), 6 parts of rare earth, 1 part of negative ion powder, 10 parts of polyvinyl alcohol and 5 parts of Model HN-R50Y3 zirconia ceramic powder (Hangzhou Hengna New Materials Co., Ltd), stirred at 300 r/min for 30 min, left to stand, and filtered through a 150-mesh sieve to obtain the thermal insulation coating. Individual components of the raw materials were added separately at a time interval of 10 min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, and then solidified at 220° C. to form a film with a thickness of 20-30 μm.

Other conditions and parameters were same as those in Example 1.

Example 6

This example provided a method for preparing the thermal insulation coating, including the following steps.

80 parts of Model Kynar 370 PVDF resin (Arkema), 6 parts of water-based epoxy resin solution, 0.02 parts of Model CapstoneFS-3100 leveling agent (DuPont) and 10 parts of dimethylformamide diluent were added into a mixer, and stirred at a speed of 100 r/min for 5 min. The obtained mixture in the mixer was added with 9 parts of Model VS5500 glass microbead (3M Corporation), 5 parts of ytterbium modified nano-alumina powder, 3 parts of Model R105 titanium dioxide powder (DuPont), and 2 parts of rare earth and 8 parts of polyvinyl alcohol, stirred at 300 r/min for 30 min, left to stand, and filtered through a 150-mesh to obtain the thermal insulation coating. Individual components of the raw materials were added separately at a time interval of 10 min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then cured at 220° C. to form a film with a thickness of 20-30 μm.

Other conditions and parameters were same as those in Example 1.

Example 7

This example provided a preparation method for the thermal insulation coating, including the following steps.

75 parts of Model Kynar 370 PVDF resin (Arkema), 5 parts of water-based epoxy resin solution, 1 part of Model CapstoneFS-3100 leveling agent (DuPont) and 20 parts of dimethylformamide diluent were added into a mixer, and stirred at a speed of 120 r/min for 5 min. The obtained mixture in the mixture was added with 10 parts of Model VS5500 glass microbead (3M Corporation), 10 parts of ytterbium modified nano-alumina powder, 4 parts of Model R105 titanium dioxide powder (DuPont), 10 parts of rare earth, and 10 parts of polyvinyl alcohol, stirred at 300 r/min for 30 min, left to stand, and filtered through a 150-mesh sieve to obtain the thermal insulation coating. Individual components of the raw materials were added separately at a time interval of 10 min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then solidified at 220° C. to form a film with a thickness of 20-30 μm.

Other conditions and parameters were same as those in Example 1.

Example 8

This example provided a method for preparing the thermal insulation coating, including the following steps.

70 parts of Model Kynar 370 PVDF resin (Arkema), 10 parts of water-based epoxy resin solution, 0.01 parts of Model CapstoneFS-3100 leveling agent (DuPont) and 18 parts of dimethylformamide diluent were added into a mixer, and stirred at a speed of 120 r/min for 5 min. The obtained mixture in the mixture was added with 5 parts of Model VS5500 glass microbead (3M Corporation), 10 parts of ytterbium modified nano-alumina powder, 5 parts of Model R105 titanium dioxide powder (DuPont), 6 parts of rare earth, 10 parts of polyvinyl alcohol and 5 parts of negative ion powder, stirred at 300 r/min for 30 min, left to stand, and filtered through a 150-mesh sieve to obtain the thermal insulation coating. Individual components of the raw materials were added separately at a time interval of 10 min.

This example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then solidified at 220° C. to form a film with a thickness of 20-30 μm.

Other conditions and parameters were same as those in Example 1.

Comparative Example 1

This comparative example provided a method for preparing the thermal insulation coating, including the following steps.

70 parts of Model Kynar 370 PVDF resin (Arkema), 10 parts of water-based epoxy resin solution, 0.05 parts of Model CapstoneFS-3100 leveling agent (DuPont) and 18 parts of dimethylformamide diluent were added into a mixer, and stirred at a speed of 100 r/min for 5 min. The obtained mixture in the mixer was added with 10 parts of ytterbium modified nano-alumina powder, 3 parts of Model R105 titanium dioxide powder (DuPont), 6 parts of rare earth, 10 parts of polyvinyl alcohol and 5 parts of Model HN-R50Y3 zirconia ceramic powder (Hangzhou Hengna New Materials Co., Ltd), stirred at 300 r/min for 30 min, left to stand, and filtered through a 150-mesh sieve to obtain the thermal insulation coating. Individual components of the raw materials were added separately at a time interval of 10 min.

This comparative example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then solidified at 220° C. to form a film with a thickness of 20-30 μm.

Other conditions and parameters were same as those in Example 1.

Comparative Example 2

This comparative example provided a preparation method for the thermal insulation coating, including the following steps.

70 parts of Model Kynar 370 PVDF resin (Arkema), 10 parts of water-based epoxy resin solution, 0.05 parts of Model CapstoneFS-3100 leveling agent (DuPont) and 18 parts of dimethylformamide diluent were added into a mixer, and stirred at a speed of 100 r/min for 5 min. The obtained mixture in the mixture was added with 1 part of Model VS5500 glass microbead (3M Corporation), 3 parts of Model R105 titanium dioxide powder (DuPont), 6 parts of rare earth, 10 parts of polyvinyl alcohol and 5 parts of Model HN-R50Y3 zirconia ceramic powder (Hangzhou Hengna New Materials Co., Ltd), stirred at 300 r/min for 30 min, left to stand, and filtered through a 150-mesh sieve to obtain the thermal insulation coating. Individual components of the raw materials were added separately at a time interval of 10 min.

This comparative example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then solidified at 220° C. to form a film with a thickness of 20-30 μm.

Other conditions and parameters were same as those in Example 1.

Comparative Example 3

This comparative example provided a preparation method for the thermal insulation coating, including the following steps.

70 parts of Model Kynar 370 PVDF resin (Arkema), 10 parts of water-based epoxy resin solution, 0.05 parts of Model CapstoneFS-3100 leveling agent (DuPont) and 18 parts of dimethylformamide diluent were added into a mixer, and stirred at a speed of 100 r/min for 5 min. The obtained mixture in the mixer was added with 3 parts of Model R105 titanium dioxide powder (DuPont), 6 parts of rare earth, 10 parts of polyvinyl alcohol and 5 parts of Model HN-R50Y3 zirconia ceramic powder (Hangzhou Hengna New Materials Co., Ltd) and 5 parts of negative ion powder, stirred at 300 r/min for 30 min, left to stand, and filtered through a 150-mesh to obtain the thermal insulation coating. Individual components of the raw materials were added separately at a time interval of 10 min.

This comparative example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then cured at 220° C. to form a film with a thickness of 20-30 μm.

Other conditions and parameters were same as those in Example 1.

Comparative Example 4

The comparative example 4 provided a method for preparing the thermal insulation coating, including the following steps:

70 parts of Model Kynar 370 PVDF resin (Arkema), 10 parts of water-based epoxy resin solution, 0.05 parts of Model CapstoneFS-3100 leveling agent (DuPont) and 18 parts of dimethylformamide diluent were added into a mixer, and stirred at a speed of 100 r/min for 5 min. The obtained mixture in the mixer was added with 10 parts of ytterbium modified nano-alumina powder, 5 parts of Model VS5500 glass microbead (3M Corporation), 3 parts of Model R105 titanium dioxide powder (DuPont), 6 parts of rare earth, 5 parts of Model HN-R50Y3 zirconia ceramic powder (Hangzhou Hengna New Materials Co., Ltd) and 5 parts of negative ion powder, stirred at 300 r/min for 30 min, left to stand, and filtered through a 150-mesh sieve to obtain the thermal insulation coating. Individual components of the raw materials were added separately at a time interval of 10 min.

This comparative example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then solidified at 220° C. to form a film with a thickness of 20-30 μm.

Other conditions and parameters were same as those in Example 1.

Comparative Example 5

This comparative example provided a preparation method for the thermal insulation coating, including the following steps.

70 parts of Model Kynar 370 PVDF resin (Arkema), 0.05 parts of Model CapstoneFS-3100 leveling agent (DuPont) and 18 parts of dimethylformamide diluent were added into a mixer, and stirred at a speed of 100 r/min for 5 min. The obtained mixture in the mixer was added with 10 parts of ytterbium modified nano-alumina powder, 5 parts of Model VS5500 glass microbead (3M Corporation), 3 parts of Model R105 titanium dioxide powder (DuPont), 6 parts of rare earth, 10 parts of polyvinyl alcohol, 5 parts of Model HN-R50Y3 zirconia ceramic powder (Hangzhou Hengna New Materials Co., Ltd) and 5 parts of negative ion powder, stirred at 300 r/min for 30 min, left to stand, and filtered through a 150-mesh sieve to obtain the thermal insulation coating. Individual components of the raw materials were added separately at a time interval of 10 min.

This comparative example further provided a method for applying the thermal insulation coating on a metal surface, including the following steps.

The thermal insulation coating obtained above was coated on a galvanized steel sheet coated with a fluorocarbon primer with a thickness of 20 μm by using a wire coater or a bar coater, then solidified at 220° C. to form a film with a thickness of 20-30 μm.

Other conditions and parameters were same as those in Example 1.

Formulas of the thermal insulation coating in the Examples 1-8 and the Comparative examples 1-5 were listed in table 1.

TABLE 1

| Components | Examples | | | | | | | | Comparative examples | | | | |
| | 1 | 2 | 3 | 4 | 5 | 6 | 7 | 8 | 1 | 2 | 3 | 4 | 5 |
| --- | --- | --- | --- | --- | --- | --- | --- | --- | --- | --- | --- | --- | --- |
| PVDF resin | 70 | 70 | 70 | 70 | 70 | 80 | 75 | 70 | 70 | 70 | 70 | 70 | 70 |
| Water-based epoxy resin solution | 10 | 10 | 10 | 10 | 10 | 6 | 5 | 10 | 10 | 10 | 10 | 10 | 0 |

TABLE 1-continued

| Components | | Examples | | | | | | | | | Comparative examples | | | | |
|---|---|---|---|---|---|---|---|---|---|---|---|---|---|---|---|
| | 1 | 2 | 3 | 4 | 5 | 6 | 7 | 8 | | 1 | 2 | 3 | 4 | 5 |
| Hollow glass microbead | 1 | 3 | 5 | 7 | 9 | 9 | 10 | 5 | | 0 | 1 | 0 | 5 | 5 |
| Ytterbium modified nano-alumina powder | 10 | 10 | 10 | 10 | 10 | 5 | 10 | 10 | | 10 | 0 | 0 | 10 | 10 |
| Diluent | 18 | 18 | 18 | 18 | 18 | 10 | 20 | 18 | | 18 | 18 | 18 | 18 | 18 |
| Polyvinyl alcohol | 10 | 10 | 10 | 10 | 10 | 8 | 10 | 15 | | 10 | 10 | 10 | 0 | 10 |
| Titanium dioxide powder | 3 | 3 | 3 | 3 | 3 | 3 | 4 | 5 | | 3 | 3 | 3 | 3 | 3 |
| Rare earth | 6 | 6 | 6 | 6 | 6 | 2 | 10 | 6 | | 6 | 6 | 6 | 6 | 6 |
| Negative ion powder | 3 | 3 | 5 | 2 | 1 | 0 | 0 | 5 | | 0 | 0 | 5 | 5 | 5 |
| Leveling agent | 0.05 | 0.05 | 0.05 | 0.05 | 0.05 | 0.02 | 1 | 0.01 | | 0.05 | 0.05 | 0.05 | 0.05 | 0.05 |
| Zirconia ceramic powder | 5 | 5 | 5 | 5 | 5 | 0 | 0 | 10 | | 5 | 5 | 5 | 5 | 5 |

The thermal insulation coatings obtained in Examples 1-8 and Comparative examples 1-5 were tested for their performances. In particular, the galvanized steel sheets coated with the thermal insulation coatings obtained in Examples 1-8 and Comparative examples 1-5 were illuminated at 25° C. for 2 h, and then a temperature difference between an inner surface and an outer surface of the galvanized steel sheets were measured by using an infrared thermodetector,

TABLE 2

| | Solar reflectance | Hemispherical emittance | Near infrared reflectance |
|---|---|---|---|
| Example 1 | 0.66 | 0.86 | 0.80 |
| Example 2 | 0.68 | 0.87 | 0.82 |
| Example 3 | 0.72 | 0.89 | 0.85 |
| Example 4 | 0.70 | 0.88 | 0.83 |
| Example 5 | 0.65 | 0.85 | 0.79 |
| Example 6 | 0.65 | 0.86 | 0.79 |
| Example 7 | 0.66 | 0.85 | 0.80 |
| Example 8 | 0.70 | 0.87 | 0.82 |
| Comparative example 1 | 0.62 | 0.82 | 0.76 |
| Comparative example 2 | 0.63 | 0.81 | 0.77 |
| Comparative example 3 | 0.60 | 0.79 | 0.75 |
| Comparative example 4 | 0.61 | 0.80 | 0.77 |
| Comparative example 5 | 0.62 | 0.81 | 0.75 |

TABLE 3

| | Outer surface temperature/° C. | Inner surface temperature/° C. | Temperature difference/° C. |
|---|---|---|---|
| Example 1 | 33 | 30 | 3 |
| Example 2 | 32 | 28 | 4 |
| Example 3 | 34 | 26 | 8 |
| Example 4 | 33 | 27 | 6 |
| Example 5 | 32 | 29 | 3 |
| Example 6 | 33 | 30 | 3 |
| Example 7 | 32 | 28 | 4 |
| Example 8 | 33 | 29 | 4 |
| Comparative example 1 | 32 | 30 | 2 |
| Comparative example 2 | 31 | 29 | 2 |
| Comparative example 3 | 31 | 30 | 1 |
| Comparative example 4 | 33 | 31 | 2 |
| Comparative example 5 | 31 | 29 | 2 |

It can be seen from Tables 2-3 that, all the thermal insulation coatings in Examples 1-8 and Comparative examples 1-5 show some thermal insulation effect, and all the thermal insulation coatings in Examples 1-8 achieve a temperature difference of more than 3° C. between the inner surface and the outer surface. Among the examples, the thermal insulation coating of Example 3 achieves the best thermal insulation effect, for example, a temperature difference of up to 8° C. between the inner surface and the outer surface, showing an obvious thermal insulation effect.

It can be seen from the testing data of Examples 1-5 that, as the amount of the hollow glass microbead added increases gradually, the temperature difference is increased at the first, and then decreased. When 5 parts of the glass microbead is added, the best thermal insulation effect is achieved. In Comparative example 1 without hollow glass microbead, the temperature difference between the inner surface and the outer surface is only 2° C., achieving no obvious thermal insulation effect. The hollow glass microbead serves a function of blocking heat conduction, and thus can efficiently improve the thermal insulation effect of the thermal insulation coating.

In Comparative Example 2, no ytterbium modified nano-powder is added. In comparative example 3, no hollow glass microbead and the ytterbium modified nano-alumina powder is added. Both of the thermal insulation coatings obtained in Comparative examples 2-3 show poor thermal insulation effect. It can be seen that, comparing with the temperature difference in Example 3, an appropriate amount of both hollow glass microbead and ytterbium modified nano-powder may improve the performance of the thermal insulation coating and increase the thermal insulation effect. The ytterbium modified nano-powder serves a function of thermal sealing and insulation.

In Comparative Example 4, no polyvinyl alcohol is added. In Comparative example 5, no water-based epoxy resin solution is added. Both of the thermal insulation coatings obtained in Comparative examples 4-5 show poor thermal insulation effect. It can be seen that, comparing with the temperature difference in Example 3, adding both of the polyvinyl alcohol and the ytterbium modified nano-alumina powder can significantly increase the thermal insulation performance of the thermal insulation coating. The reason can speculate that the PVDF resin, the water-based epoxy resin solution and the polyvinyl alcohol may work synergistically to form a dense film with excellent thermal insulation effect, since the polyvinyl alcohol has good interfacial activity so that the raw materials can be mixed more evenly, and the obtained coating can achieve a better leveling property.

Further, all of the thermal insulation coatings in Examples 1-8 were coated on a metal surface, and then tested regarding water resistance (48 h), acid resistance (168 h), alkali resistance (168 h), and salt spray resistance (720 h) thereof according to the standards of HG/T 4341-2012. All the results as obtained met corresponding test requirements.

The parts or structures not specifically described in the present application may adopt existing technologies or products, and thus will not be described herein.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A thermal insulation coating composition, wherein the thermal insulation coating composition comprises the following components in parts by weight:

70-80 parts of polyvinylidene difluoride (PVDF) resin, 5-10 parts of water-based epoxy resin solution, 1-10 parts of hollow glass microbead, 5-10 parts of ytterbium modified nano-powder, 10-20 parts of diluent, 8-15 parts of polyvinyl alcohol, 3-5 parts of titanium dioxide powder, 2-10 parts of rare earth element containing compound, and 0.01-1 parts of leveling agent.

2. The thermal insulation coating composition according to claim 1, further comprising 0-10 parts of zirconia ceramic powder having a particle size of 30-50 nm.

3. The thermal insulation coating composition according to claim 1, wherein the ytterbium modified nano-powder is ytterbium modified nano-alumina powder having a particle size of 500-600 nm.

4. The thermal insulation coating composition according to claim 1, wherein the ytterbium modified nano-powder is prepared by mixing nano-alumina and ytterbium oxide powder.

5. The thermal insulation coating composition according to claim 4, wherein the ytterbium modified nano-powder is made from the nano-alumina and the ytterbium oxide powder in a weight ratio of (1-2):(1-4) by steps of grinding, drying, crumbling and calcining, wherein the drying is performed under a temperature of not more than 70° C. for 20-30 h, and the calcining is performed under a temperature of 900-1250° C. with a heating rate of 8-15° C./min.

6. A method for applying the thermal insulation coating composition according to claim 1 on a metal surface, comprising the following steps:

coating the thermal insulation coating composition on a metal surface coated with a primer, and solidifying the thermal insulation coating composition at a temperature of 200-245° C. to form a film with a thickness of 20-30 µm.

\* \* \* \* \*